United States Patent [19]

Retter

[11] Patent Number: 4,872,132

[45] Date of Patent: Oct. 3, 1989

[54] METHOD AND MEANS FOR BLOCK FLOATING POINT ARITHMETIC

[75] Inventor: Refael Retter, Haifa, Israel

[73] Assignee: Zoran Corporation, Santa Clara, Calif.

[21] Appl. No.: 25,329

[22] Filed: Mar. 13, 1987

[51] Int. Cl.$^4$ .............................................. G06F 7/38
[52] U.S. Cl. ................................................... 364/748
[58] Field of Search ... 364/748, 726, 736, 200 MS File

[56] References Cited

U.S. PATENT DOCUMENTS

| 4,041,461 | 8/1977 | Kratz et al. | 364/200 |
| 4,107,773 | 8/1978 | Gilbreath et al. | 364/200 |
| 4,241,411 | 12/1980 | Krasner et al. | 364/726 |
| 4,450,525 | 5/1984 | Demuth et al. | 364/200 |
| 4,501,149 | 2/1985 | Konno et al. | 364/726 X |

OTHER PUBLICATIONS

L. Rabiner et al., "Theory and Application of Digital Signal Processing", Prentice-Hall, Inc., 1975, pp. 361–363; 573–579.

*Primary Examiner*—Gary V. Harkcom
*Assistant Examiner*—Long T. Nguyen
*Attorney, Agent, or Firm*—Flehr, Hohbach, Test, Albritton & Herbert

[57] ABSTRACT

Circuitry for use in operating on block floating-point data where all data in a block has a scale factor associated therewith including a maximum scale register for storing the maximum scale factor of the data in a block, a subtractor for obtaining a difference value between the maximum scale factor and a data scale factor as the data is retrieved for operation, and a computer for adjusting the scale of retireved data by the difference prior to operation on the data. As the data in a block is operated on scale overflow is stored and used to adjust subsequent data as read from memory prior to operation thereon. A counter is provided for counting all scale overflow as a result of operations on all data in a block with the maximum scale register being updated based on the total count following operations on all data in the block.

6 Claims, 1 Drawing Sheet

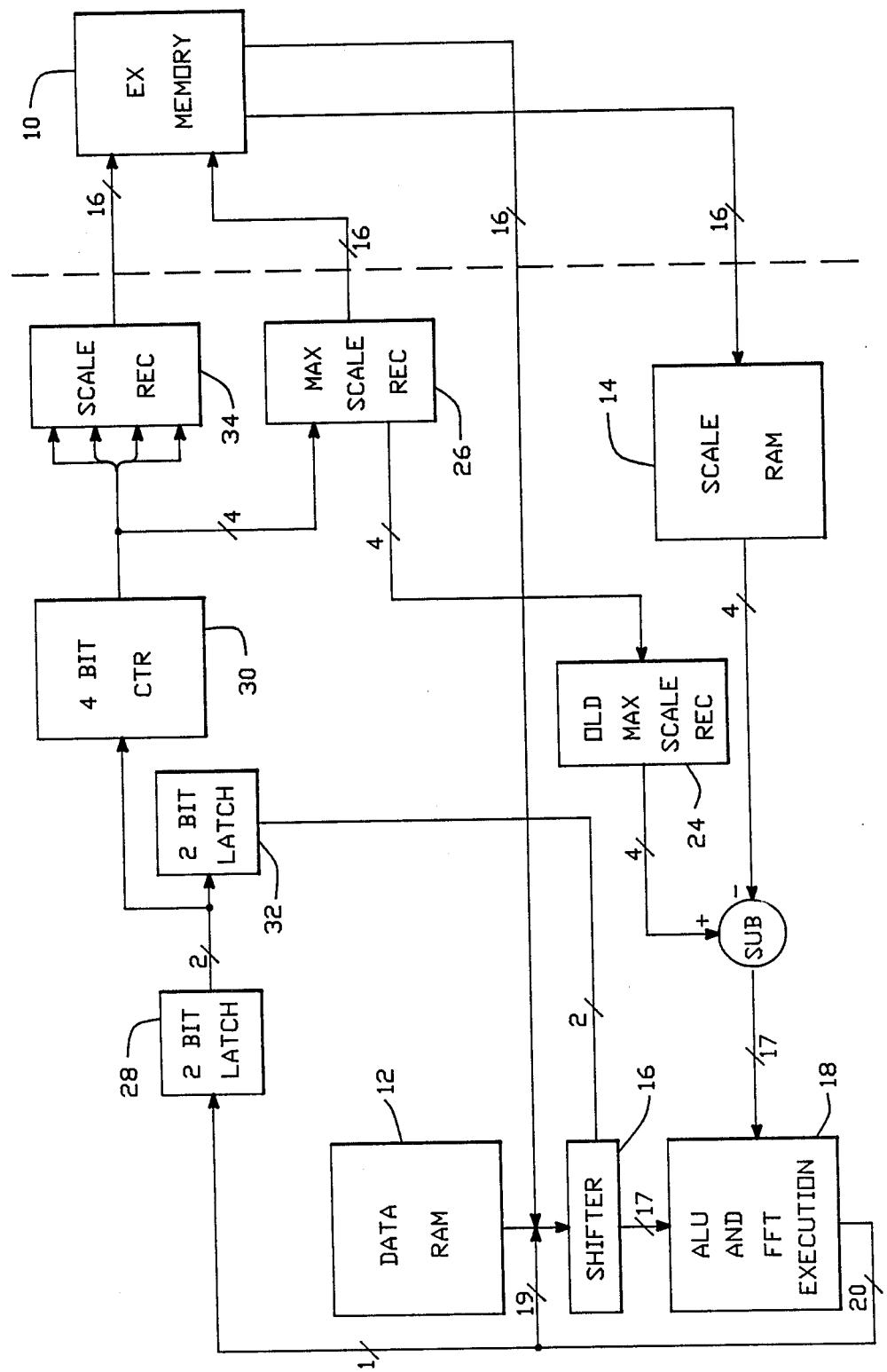

METHOD AND MEANS FOR BLOCK FLOATING POINT ARITHMETIC

BACKGROUND OF THE INVENTION

This invention relates generally to block floating point arithmetic such as used in the butterfly operation of the decimation in time algorithm used in Fast Fourier Transforms (FFT), and more particularly the invention relates to circuitry for use in implementing block floating point arithmetic.

The Fourier transform arises in a variety of situations in science and engineering and is one of the most widely used and studied mathematical transform techniques. The Fast Fourier Transform, or FFT is well adapted to the very rapid calculation of Fourier transforms on digital systems.

A Fourier series is used to perform a spectral analysis. The function being analyzed is represented as the sum of a series of sine and cosine waves of appropriate frequencies and appropriate amplitudes. By noting the frequencies used in the representation, a spectral analysis of the original signal results directly.

According to a well-known relationship, convolutions in the time domain can be implemented as vector multiplications of the frequency representations of the input signals in the transformed (frequency) domain. This fact allows the rapid implementation of filters through the convolution of the filter sequence with the data sequence in the frequency domain; the method is generally referred to as fast convolution and is one of the most important areas in which signal engineers use Fourier transforms and FFTs in particular. The Fourier transform is also the gateway to other widely used transforms such as the cosine transform.

Rabiner and Gold, *Theory and Application of Digital Signal Processing*, Prentice Hall, 1975 discusses spectrum analysis and the fast Fourier transform. As described therein a basic operation of the decimation in time algorithm used in FFT is the so-called Butterfly in which two complex number inputs, A and B, are combined with a weighting factor, W, to give the two outputs X and Y via the operation $$X = A + W_N^k B$$

$$Y = A - W_N^k B$$

Applicant's copending application Ser. No. 904,421 filed Sept. 8, 1986, is directed to circuitry for expeditiously performing the Butterfly operations on a plurality of sets of complex data. A Pipelined mode of operation is employed whereby several sets of data are operated on concurrently and two inputs are entered and two outputs are generated every four cycles.

Each Butterfly computation in the FFT involves multiplication of two complex numbers and another addition/subtraction of complex numbers. All together the operation involves addition of three numbers, which may cause an overflow of up to two bits. Partial prevention of such an overflow can be achieved by automatically shifting the results of each pass 1 bit to the right (divide by 2), but that does not prevent overflow in the rare case of 2-bit overflow—when both inputs to the Butterfly equal 1 and the angle of rotation is anywhere between 0 and 90 degrees. On the other hand, it may reduce the working dynamic range substantially—when actually there were no overflows, and the shifting was performed unnecessarily. Another way of handling the overflow problem is by scaling (shifting) the pass results by the required number of bits so as to prevent overflow, only when an overflow occurs in any of the computed Butterflies in that pass. This way, the scaling is done only when necessary, retaining maximum precision throughout the whole operation, and the number of shifts is according to the actual number of overflow bits—giving complete protection against losing information on account of the overflow. This second method is often referred to as Block Floating Point Arithmetic.

Using Block Floating Arithmetic for FFT computation means that different blocks of processed data may have different scale factors associated with them (the scale factor is the total number of right shifts carried out during one FFT instruction execution). For instance, when computing 2-D FFTs, the FFT of each row (or a number of rows in cases where row size allows multiple simultaneous FFTs) may be computed by one FFT operation with its associated scale factor. When more than one FFT operation is required for computation of all the row FFTs, the data in each column in the resultant image is associated with several scale factors. Therefore, prior to computation of the column FFTs the data in each column needs to be aligned (alignment of the binary point, if the scale factors are regarded as exponents). The alignment should be according to the maximum scale factor associated with any of the involved data.

SUMMARY OF THE INVENTION

An object of the present invention is improved circuitry for expeditiously implementing block floating point arithmetic such as used in executing fast Fourier transforms.

A feature of the invention is the use of a maximum scale register for the largest scale of data in a block, and the scaling of data based on the difference in the maximum scale register content and the individual data scale factor.

Another feature of the invention is latch means for storing overflows during the processing of block data and the adjustment of data in subsequent data to conform with the overflow N-scale.

Briefly, circuitry in accordance with the invention utilizes an internal scale register, a max scale register, and an old max scale register to support block floating operations and facilitate required scaling of numbers.

The actual number of shifts which occur during a specific FFT operation is counted and retained by one of the nibbles (4-bit hex character) in the scale register. The nibble in current use is pointed to by the scale register pointer. At the end of each FFT computation, the pointer is updated to point to the next nibble. After reaching the end of the scale register, the pointer reverts to the beginning of the register. The pointer may also be directly reset by a LDSM instruction with MD=0, selecting the scale register as the operand and UP=1 resetting the max scale register and the scale register pointer and indicating update of the old max scale register with the current contents of the max scale register.

The max scale register retains the value of the largest scale factor used in any of the FFT operations since the last reset. The old max scale register retains the previous maximum scale factor as mentioned above. The scale RAM, which is 16 words long, can store up to 64 scale nibbles. It is loaded with the desired values through using the LDSM instruction with MD=0. The NMPT parameter in the instruction indicates the number of consecutive words to be loaded (the number of nibbles =4*NMPT) and the MBA parameter specifies their initial location in external memory.

For alignment of the results of multiple FFT operations, one needs to shift every point x(i) $n_i$ bits to the right, where $n_i = n_{i-sfi}$
$n_f = $ max.__scale__factor - sf; and
$sf_i$ is the scale factor associated with x(i).

The invention and objects and features thereof will be more readily apparent from the following detailed description and appended claims when taken with the drawing.

BRIEF DESCRIPTION OF THE DRAWING

The drawing is a functional block diagram of a preferred embodiment of the invention.

DETAILED DESCRIPTION OF ILLUSTRATIVE EMBODIMENT

Referring now to the drawing, the functional block diagram including circuitry for facilitating the scaling of block floating data includes an external memory 10 in which data and scale factors therefor are stored. The external memory 10 is connected to an internal data RAM memory 12 for the initial loading of data to be operated on. The external memory is also connected to a scale RAM 14 which stores the scale factors associated with the data stored in data RAM 12. Data RAM 12 is connected through a shifter 16 to an ALU 18 for the scaling of data prior to an FFT execution on the data. Scale factors from scale RAM 14 are applied through a subtractor 22 which subtracts the scale for data within the floating block from a stored maximum scale factor stored in an old max scale register 24. The old max scale register 24 is periodically updated by a max scale register 26 after each complete FFT operation cycle on a block of data. The properly scaled data from ALU 18 is operated on by an FFT execution unit within ALU 18 which can include Butterfly circuitry as disclosed in copending application Ser. No. 904,421, supra. As noted above, each Butterfly computation in the FFT involves multiplication of two complex numbers and another addition/subtraction of complex numbers, and altogether the operation involves addition of three numbers which may cause an overflow of up to two bits. The overflow of up to two bits is stored in a 2-bit latch 28, and at the end of each FFT pass the count stored in latch 28 is transferred to a 4-bit counter 30 and to a second 2-bit latch 32. The 4-bit counter 30 can store up to a 16 value overflow for each complete FFT operation, and at the end of each FFT operation the count stored in counter 30 is transferred to a scale register 34 and updates a maximum scale register 26. Maximum scale register 26 is then loaded into the old max scale register 24 prior to the beginning of subsequent operations on the data.

In operation, as data is read from data RAM 12 and applied to ALU 18, a corresponding scale factor for the data is retrieved from scale RAM 14 which indicates the scale factor for the data as read. However, so that all data in a block is to the same scale, the maximum scale for the block of data from a prior FFT operation is retrieved from register 24, and the difference the max scale and the data scale is obtained at subtractor 22 and applied to ALU 18 for adjusting the scale of data as required.

During FFT execution any overflow of the resultant data is stored in latch 28, and the stored value is then applied to 4-bit counter 30 for updating scale register 34 at the end of each FFT operation and is also stored in a 2-bit latch 32. If data in the FFT for any sample overflows by one or two bits, the data must be shifted right by the one or two bits if overflowed before the data is processed in future passes. This is accomplished by transferring the contents of latch 28 to latch 32 at the end of each FFT pass. The next time the data is accessed by any instruction, shifter 16 will adjust all accessed data in the RAM uniformly by shifting it 0, 1 or 2 two bits (as determined by the contents of latch 32) before transferring it to ALU 18 or to the external memory bus (not shown).

One application of the invention is in vector signal processor (VSP) manufactured by Zoran Corporation. The required scale operation is done using the VSP SCL instruction. The instruction basically uses scale factors from the scale RAM. The subtract parameter in the instruction allows using the difference between the old max scale register and the appropriate scale factor from the scale RAM for scaling the data. Therefore, if prior to calling the SCL instruction the scale register contents are moved to the scale RAM (using STI instruction in order to move the scale register contents to external memory and then LDSM instruction to load the values back into the scale RAM), and the old max scale register is loaded with the value of the max scale register (using the same LDSM), then using SCL with SB=1 will accomplish the required alignment.

Two parameters in the SCL instruction allow for versatile application of the different scale factors to the vector operand points. These are: SCale Block Length (SCLBL) and SCale Vector Length (SCLVL) The NMPT parameter in the SCL instruction specifies the total operand vector length. The SCLBL specifies the number of consecutive points to which the same scale factor will be applied while the SCLVL specifies the number of different scale factors to be used.

If: NMPT>SCLBL * SCLVL the VSP will return to the first scale factor and apply it to the next SCLBL point and so on, until all NMPT points have been exhausted.

For example, if the vector to be scaled is a result of four different FFT operations: A, B, C and D, and the points are organized in the following pattern:

AAAAAAAABBBBBBBBCCCCCCCCDDDDDDDD then the SCL instruction will be as follows:

SCL NMPT:32, ... SCLVL:4, SCLBL:8, ...

| Number of scale factors | Number of consecutive points to be scaled by the same factor |
| --- | --- | which indicates that the instruction is going to use the first 4 values in the scale RAM and apply each value to 8 consecutive data points.

If the pattern of the data points were as follows:

AABBCCDDAABBCCDDAABBCC-
DDAABBCCDD the appropriate SCL instruction would be:

SCL NMPT:32, ... SCLVL:4, SCLBL:2, ...

which means that the VSP is going to use the same scale factors as in the previous case, but it is now going to apply each factor to 2 consecutive points, and since SCLVL*SCLBL=8, the same pattern of scale factor application is going to be repeated three more times until an NMPT data points have been scaled. (NMPT does not have to be an integer multiple of SCLVL*SCLBL.)

A special case of SCLVL, SCLBL relationship is when SCLVL=1 (only one scale factor is to be used for scaling the vector). In that case, SCLBL may take a value between 0–3, which serves as a pointer to the location in the scale RAM from which the scale factor is to be picked. For example, if the vector pattern were:

BBBBBBBBBBBBBBBBBBBBBBBB

The SCL instruction would be:

SCL NMPT:32, ... SCLVL:1, SCLBL=1 ...

indicating that the scale factor to be used for scaling all NMPT points of the vector resides in second location of scale RAM.

The scaling of block floating point arithmetic computation executed by the circuitry in accordance with the invention has proved to be particularly useful in executing the FFT algorithm. However, while the invention has been described with reference to one embodiment for this application, the description is illustrative of the invention and is not to be construed as limiting the invention. Various modifications and applications may occur to those skilled in the art without departing from the true spirit and scope of the invention as defined by the appended claims.

What is claimed:

1. Circuitry for use with an arithmetic-logic unit operating on block floating-point data where all data have a scale factor associated therewith, said circuitry comprising:

a maximum scale register for storing the maximum scale factor of the data in a block stored in external memory, first means for receiving the maximum scale factor and data scale factors as data is retrieved from memory for operation by the arithmetic-logic unit and obtaining a difference value between the maximum scale factor and a data scale factor, means responsive to said difference value for adjusting retrieved data by said difference prior to operation thereon, an overflow register and means responsive to overflow of data from operations by the arithmetic-logic unit for storing scale overflow in said overflow register as a result of data operations.

2. Circuitry as defined by claim 1 and further including shifter means connected to said means responsive to data overflow for shifting the scale of data when retrieved based on scale overflow as a result of operations on previously retrieved data in a block.

3. Circuitry as defined by claim 2 and further including a counter responsive to the arithmetic-logic unit for counting all scale overflow as a result of operations on all data in a block, and means responsive to said counter for updating said maximum scale register following operations on all data in the block.

4. Circuitry for implementing a Fast Fourier Transform algorithm on block floating-point data, said circuitry comprising an external memory for storing data and a scale factor for each date in a group, a first internal memory for storing data from said external memory, first transfer means for transferring data from said external memory to said first internal memory, a second internal memory for storing scale factors of data stored in said first internal memory, second transfer means for transferring scale factors from said external memory to said second internal memory, a maximum scale register for storing a maximum scale factor of the data in a block, means for obtaining a difference value between the maximum scale factor and data scale factors stored in said second internal memory as data is retrieved from said first internal memory for operation, shifter means responsive to said difference value for shifting data retrieved from said first internal memory by said difference value prior to operation thereon, arithmetic-logic means for receiving data from said shifter means and operating on said data in accordance with said Fast Fourier Transform algorithm, and means connected with and responsive to said arithmetic-logic means for storing scale overflow as a result of date operations.

5. Circuitry as defined by claim 4 and further including shifter means responsive to said means for storing scale overflow for shifting the scale of data when retrieved form said first internal memory based on scale overflow as a result of operation on previously retrieved data.

6. Circuitry as defined by claim 5 and further including a counter responsive to the arithmetic-logic unit for counting all scale overflow as a result of operation on all data in a block, and means responsive to said counter for updating said maximum scale register following operations on all data in the block.

* * * * *